(No Model.) 2 Sheets—Sheet 1.
G. HERZOG.
WINDMILL.
No. 504,035. Patented Aug. 29, 1893.
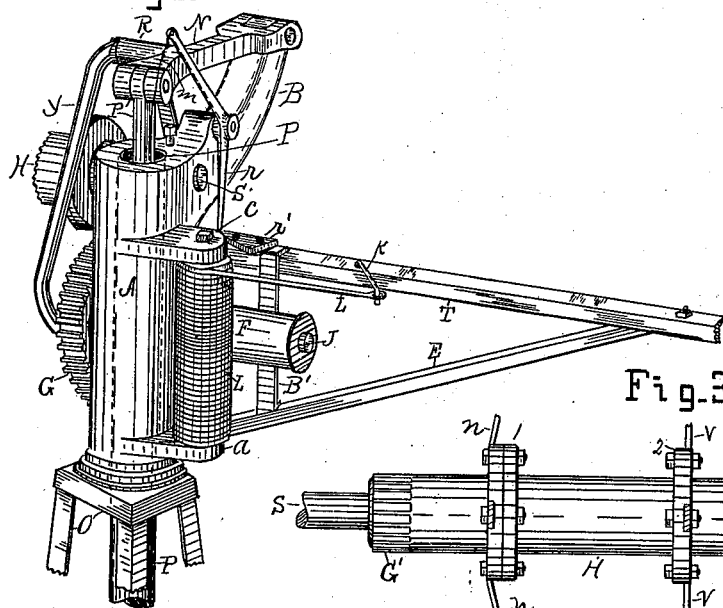
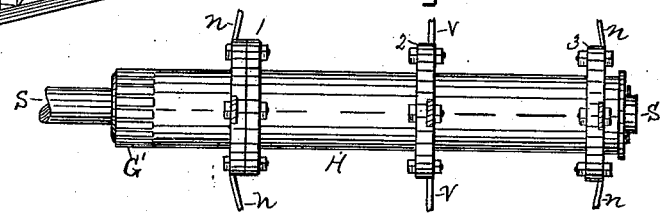
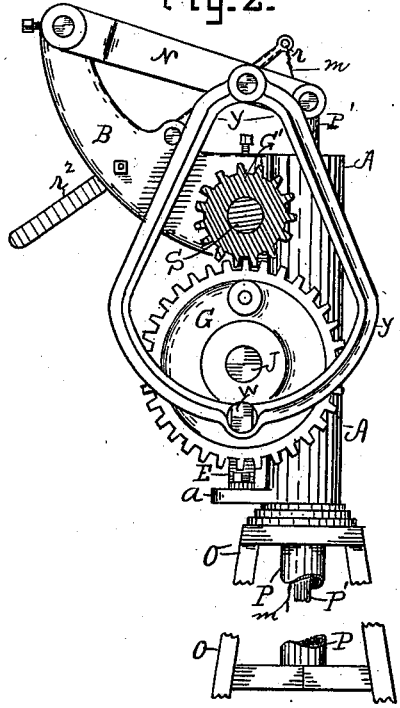
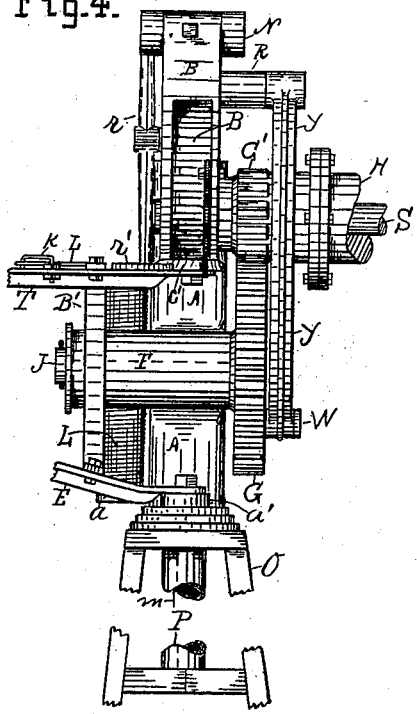
Witnesses:
Ray Hutchins.
Herbert Cowell
Inventor:
George Herzog By
Thos H Hutchins his atty (No Model.) 2 Sheets—Sheet 2.
G. HERZOG.
WINDMILL.
No. 504,035. Patented Aug. 29, 1893.
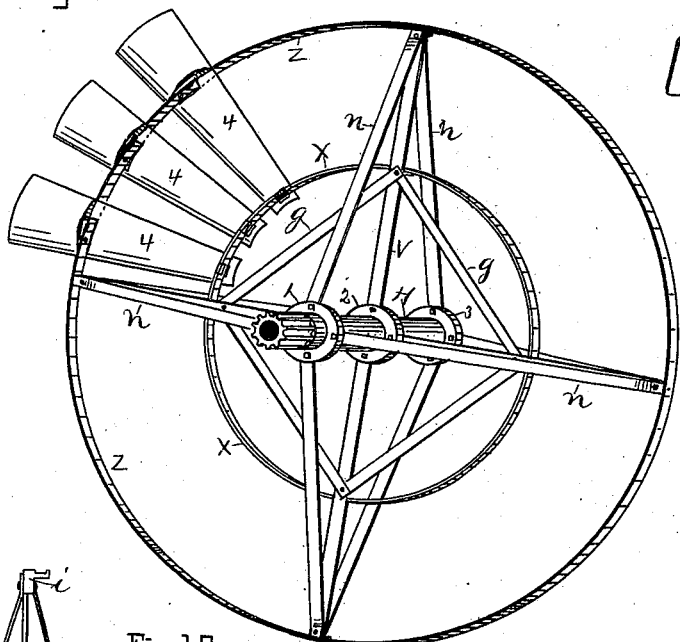
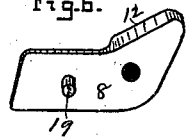
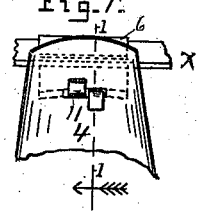
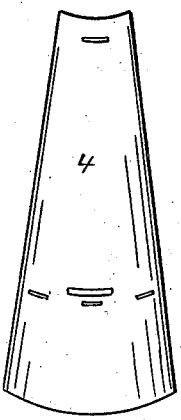
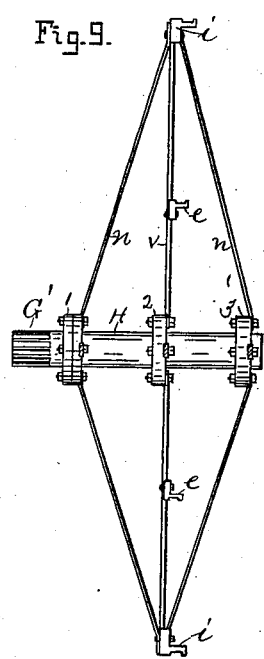
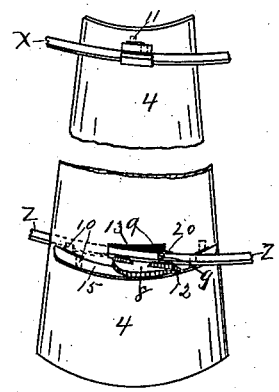
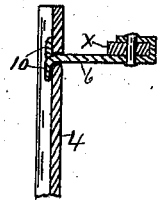
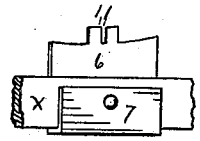
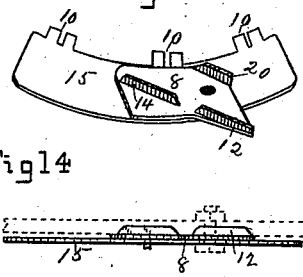
Witnesses:
Ray H. Hutchins.
Walter Butterfield
Inventor:
George Herzog By
Thos. H. Hutchins his atty

UNITED STATES PATENT OFFICE.

GEORGE HERZOG, OF JOLIET, ILLINOIS.

WINDMILL.

SPECIFICATION forming part of Letters Patent No. 504,035, dated August 29, 1893.

Application filed February 13, 1893. Serial No. 462,050. (No model.)

*To all whom it may concern:*

Be it known that I, GEORGE HERZOG, a citizen of the United States of America, residing at Joliet, in the county of Will and State of Illinois, have invented certain new and useful Improvements in Windmills, of which the following is a specification, reference being had therein to the accompanying drawings and the letters and figures of reference thereon, forming a part of this specification, in which—

Figure 1 is a perspective view of the working parts of the wind mill, and of the upper part of the tower, the wheel and tail vane being omitted. Fig. 2 is a front elevation of the working parts of the wind mill, and of the upper part of the tower, the wheel being omitted, and the wheel hub and its shaft being shown in section. Fig. 3 is a side view of the wheel hub, and of a section of the shaft on which it turns. Fig. 4 is a side elevation of the working parts of the wind mill, and of the upper part of the tower, the wheel and tail vane being omitted. Fig. 5 is a perspective view of the wheel, a portion only of the sails being shown. Fig. 6 is a perspective view of one of the plates for attaching the sails to the rims. Fig. 7 is a view of the inner end of one of the sails showing the means for attaching it to the inner rim of the wheel.
Fig. 8 is a side view of one of the sails showing its perforations for receiving the fastenings for attaching it to the rims of the wheel. Fig. 9 is a side view of the wheel hub, showing the spokes attached to its flanges, and showing the means for attaching the annular bands or rims of the wheel to the spokes. Fig. 10 is a side view of one of the sails showing it attached to each rim of the wheel. Fig. 11 is a section of Fig. 7 taken on line 1. Fig. 12 is a perspective view of the fastening plate for connecting the inner rim of the wheel, to the inner end of the sail. Fig. 13 is a perspective view of the fastening plates for attaching the outer ends of the sails to the outer rim of the wheel and Fig. 14 is a side view of Fig. 13, showing in broken lines, said fastening plates attached to the inner rim of the wheel.

This invention relates to certain improvements in wind mills, which improvements are fully set forth and explained in the following specification and claims.

Referring to the drawings A represents a turn table arranged to stand and turn on the top of the tower O on the upper extending end of the tubular shaft P. This tubular shaft P is fixed in the top of the tower, and also at its lower end in a cross bar of the tower as shown, and its end extending above the tower forms a spindle upon which the turn table A turns.

S is a shaft having its inner end secured in a bore in the turn table A, and its extending end forms a spindle on which the wheel hub H is placed and turns.

J is a shaft arranged in the integral box F of the turn table A, and has secured on its outer end the gear wheel G, which is arranged to mesh with the pinion G' on the inner end of the wheel hub H.

B is an integral arm of the turn table A, having pivotally connected to its upper end the lever N at one end, the opposite end of said lever being pivotally connected to the upper end of a pump rod P' that passes down through the hollow shaft P. *y* is a pitman for connecting said link between its ends through the medium of an integral side stud R, with a wrist pin *w* on the side of the gear wheel G, the said pitman being made in the form of a yoke so as to clear the wheel hub H.

T is the arm of the tail vane having its inner end pivotally connected to the turn table A through the medium of its integral ear lug *c'*, and having a brace E for supporting its outer end, the inner end of said brace being pivotally connected to the turn table A at or near its lower end through the medium of the integral lug *a'* of said turn table.

L is a coil spring held between the integral lugs *a. c.* of the turn table, and is connected with arm T of the tail vane by means of the rod K. The said spring is for the purpose of maintaining the tail vane at right angles with the wheel, so as to hold the wheel to the wind.

B' is a brace for connecting the inner ends of the arm T and brace E, and holding them in place.

*r* is a lever pivotally attached at about its center to the side of arm B of the turn table A. The said arm is bent between its ends so that its upper end will extend over the central part of the turn table and so that the wire *m* attached to its upper end can pass down through the opening in the center of the turn table to the ground. The opposite end of said lever bears against the inner side of a cam plate $r'$ secured on arm T a short distance from its inner end. The said arm and cord are used to turn the tail vane around in line with the wheel, so as to turn the wheel out of the wind when it is desired to stop the mill. An operator on the ground can pull on said wire and accomplish said purpose, and maintain the wheel out of the wind by fastening the lower end of said wire to some object.

The wheel is shown in Fig. 5 and consists of the hub H having on it the three annular flanges 1, 2, 3, and having the pinion G' on its inner end for meshing with gear G to give it motion. The central spokes $v$ are bolted at their inner ends to the flange 2, and connect at their outer ends with the spokes $n$ through the medium of a casting $i$ to which is secured the outer rim $z$ by means of a bolt, shown particularly in Fig. 7. The inner annular rim $x$ of the wheel is secured to the central spokes $v$ by means of the casting $e$ connected with both rim and spoke by proper bolts. The inner or central spokes $v$ are connected with each other by means of the rods or bars $g$ as shown in Fig. 5 to cause them to support each other, and give strength to the wheel.

4 are the sails intended to be made of metal and slightly concave in shape as shown in Fig. 6. The inner ends of the sails are connected to the inner rim $x$ by means of the plate 6, having its upper edge formed to hook over the edge of said rim, and provided on its lower edge with ear lugs 11 for passing through an aperture in the sail and be clinched on its opposite side to hold the sail to the rim as shown in Figs. 7 and 11.

The fastening for securing the sails to the outer rim consists of the two plates 8 and 15. The plate 15 is intended to stand on its edge on the outer side of the sail so that its ear lugs 10 may pass through an aperture in the sail and clinch on its opposite side to secure said plate to the sail. The plate 8 is bolted to the side of plate 15 by means of a bolt 9 at one end, and has an integral lug 19 near its opposite end which passes through plate 15, so as to secure that end of the said plate in place. The plate 8 is provided with the side flanges 12, 14 and 20 for inclosing the rim $z$ which is held to said plates by means of said bolt 9 as shown in Fig. 6, the direction of said flanges being such as to permit the rim $z$ to pass through the slot 13 in the sail as shown in said figure.

$r^2$ is an arm connected at its inner end to the arm B of the turn table, and is for the purpose of preventing the tail vane from turning too far backward when the tail vane and wheel are folded to be in a line parallel with each other, and the brace or bar B' is intended to engage the side of the extending box F, and hold the tail vane in a line at right angles with the wheel, when the wheel is turned to the wind.

Having thus described my invention, what I claim, and desire to secure by Letters Patent, is as follows, to wit:

1. In a wind mill the wheel comprising the combination of the hub H having the annular flanges 1, 2, 3, and having its inner end cogged to form the pinion G', spokes $v$ secured at their inner ends to flange 2, spokes $n$ secured at their inner ends to flanges 1 and 3 respectively, braces $g$ for connecting spokes $v$ with each other, rims $z$ and $x$, castings $e$ and $i$ for connecting said rims and spokes, and the sails 4 and the fastening plates for connecting the sails with said rims substantially as and for the purpose set forth.

2. In a wind mill the combination of rim $z$ plate 15 having the ear lugs 10, and adapted to stand on its edge against the side of a sail 4, sail 4 having apertures for receiving said ear lugs for securing said plate to the sail, plate 8 having the side flanges 12, 14, 20 and having stud 19, and adapted to be attached to plate 15 by bolt 9, bolt 9, and sail 4 having apertures for receiving ear lugs 10, and for receiving rim $z$ all arranged to operate substantially as and for the purpose set forth.

3. In a wind mill the combination of rim $x$ plate 6 having the hook or lip 7 for attaching said rim to said plate, and having the ear lugs 11, and the sail 4 having apertures for receiving said ear lugs for attaching said plate to said sail, all arranged to operate substantially as and for the purpose set forth.

GEORGE HERZOG.

Witnesses:
THOS. H. HUTCHINS,
RAY HUTCHINS.